(12) United States Patent
Kuriki et al.

(10) Patent No.: US 10,543,879 B2
(45) Date of Patent: Jan. 28, 2020

(54) SMALL-VEHICLE DIRECTION INDICATOR DEVICE

(71) Applicant: HONDA MOTOR CO., LTD., Tokyo (JP)

(72) Inventors: Daisuke Kuriki, Tokyo (JP); Yuta Hosoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 15/558,432

(22) PCT Filed: Mar. 17, 2016

(86) PCT No.: PCT/JP2016/058488
§ 371 (c)(1),
(2) Date: Sep. 14, 2017

(87) PCT Pub. No.: WO2016/148234
PCT Pub. Date: Sep. 22, 2016

(65) Prior Publication Data
US 2018/0057091 A1 Mar. 1, 2018

(30) Foreign Application Priority Data
Mar. 17, 2015 (JP) .................................. 2015-053288

(51) Int. Cl.
*B62J 6/00* (2006.01)
*F21S 43/00* (2018.01)
(Continued)

(52) U.S. Cl.
CPC ............... *B62J 6/005* (2013.01); *B60Q 1/34* (2013.01); *F21S 43/00* (2018.01); *F21V 3/00* (2013.01); *F21V 11/00* (2013.01); *F21Y 2115/10* (2016.08)

(58) Field of Classification Search
CPC ....... B62J 6/005; B62J 6/04; B62J 6/00; B62J 2006/006; F21S 43/50; F21S 43/51;
(Continued)

(56) References Cited

U.S. PATENT DOCUMENTS 5,526,247 A 6/1996 Sugiyama
7,012,515 B2 * 3/2006 Yamamoto ............. B60K 37/02
340/475
(Continued)

FOREIGN PATENT DOCUMENTS

DE 3128493 A1 2/1983
DE 102007033706 A1 1/2009
(Continued)

OTHER PUBLICATIONS

International Preliminary Report on Patentability with English Translation dated Jul. 25, 2017, 10 pages.
(Continued)

*Primary Examiner* — Bao Q Truong
(74) *Attorney, Agent, or Firm* — Rankin, Hill & Clark LLP

(57) ABSTRACT

A small-vehicle direction indicator device includes a directional signal light for small vehicles, such as saddle riding type vehicles, the directional signal light including a lighting unit and a plurality of light sources that are arrayed in the lighting unit in a vehicle width direction. The small-vehicle direction indicator device performs a dynamic direction indication by chain-reactive switch-ons or switch-offs of the plurality of light sources when the directional signal light is activated. In the directional signal light, between the plurality of light sources, a light-blocking wall made of an opaque member is arranged, and wherein a plurality of the light-blocking walls are arrayed in the vehicle width direction.

10 Claims, 10 Drawing Sheets

(51) Int. Cl.
*B60Q 1/34* (2006.01)
*F21V 3/00* (2015.01)
*F21V 11/00* (2015.01)
*F21Y 115/10* (2016.01)

(58) Field of Classification Search
CPC .. F21S 43/00; F21S 43/10; B60Q 1/34; B60Q 1/38; B60Q 1/2607; B60Q 1/26; F21V 3/00; F21V 11/00; F21Y 2115/10; F21W 2102/00; F21W 2103/00; F21W 2103/20
See application file for complete search history.

(56) References Cited

U.S. PATENT DOCUMENTS

| | | | | |
|---|---|---|---|---|
| 7,791,465 | B1 * | 9/2010 | El-Massry | B60Q 1/503 307/10.1 |
| 8,547,219 | B2 * | 10/2013 | Kisiel | B60Q 1/448 340/468 |
| 2002/0057578 | A1 * | 5/2002 | Kageyama | B29C 66/131 362/544 |
| 2004/0218400 | A1 | 11/2004 | Egashira | |
| 2005/0128761 | A1 * | 6/2005 | Wu | B60Q 1/32 362/498 |
| 2009/0051522 | A1 | 2/2009 | Perkins | |
| 2009/0051523 | A1 | 2/2009 | Perkins | |

FOREIGN PATENT DOCUMENTS

| | | |
|---|---|---|
| FR | 2676268 A1 | 11/1992 |
| JP | 47-35770 | 12/1972 |
| JP | 63-30236 | 2/1988 |
| JP | 2002-203408 | 7/2002 |
| JP | 2005-132256 | 5/2005 |
| JP | 2013-197439 | 9/2013 |
| JP | 2014-94611 | 5/2014 |
| WO | 2005/108857 A1 | 11/2005 |

OTHER PUBLICATIONS

International Search Report, dated Jun. 21, 2016 (Jun. 21, 2016), Application No. PCT/JP2016/058488, 4 pages.
European Search Report dated Oct. 24, 2018, 9 pages.
Chinese Office Action dated Jan. 22, 2019, with English Translation of Search Report, 7 pages.

\* cited by examiner

1

SMALL-VEHICLE DIRECTION INDICATOR DEVICE

TECHNICAL FIELD

The present invention relates to a small-vehicle direction indicator device that includes directional signal lights (blinkers) for small vehicles such as automotive two-wheeled vehicles, other saddle riding type vehicles, or the like.

The present application claims priority based on Japanese Patent Application No. 2015-053288 filed Mar. 17, 2015, the contents of which are incorporated herein by reference.

BACKGROUND ART

There is disclosed a vehicle direction indicator device on a so-called sequential lighting system (chain-reactive lighting) in which light sources are aligned in a vehicle width direction (left-right direction) and in which the light sources are sequentially switched on from the center side in the vehicle width direction toward the outside in the vehicle width direction (are switched on as if light moves) (see Patent Document 1). As a result, visually-recognizers outside the vehicle are capable of easily recognize to which direction the vehicle is to turn.

RELATED ART DOCUMENT

Patent Document

Patent Document 1: Japanese Unexamined Patent Application, First Publication No. 2014-094611

SUMMARY

Problems to be Solved by the Invention

However, in small vehicles such as automotive two-wheeled vehicles, other saddle riding type vehicles, or the like, a left-right width of the directional signal light is comparatively narrow. Therefore, with the light sources being arranged merely in the vehicle width direction in a conventional manner as described above, even the light sources are sequentially switched on in the vehicle width direction, there are cases where the movement of light is not clearly recognized due to the overlapping of light from the adjacent light sources or to other causes.

Therefore, the present invention has an object to provide a small-vehicle direction indicator device that is capable of improving visibility of dynamic direction indication by sequential lighting even in a directional signal light with a comparatively narrow left-right width for small vehicles such as automotive two-wheeled vehicles, other saddle riding type vehicles, or the like.

Means for Solving the Problem

As a solution to the aforementioned problem, an aspect of the present invention has structures as follows:

(1) A small-vehicle direction indicator device according to the aspect of the present invention includes a directional signal light for small vehicles such as saddle riding type vehicles, the directional signal light including: a lighting unit; a plurality of light sources that are arrayed in the lighting unit in a vehicle width direction; and a plurality of light chambers in which at least one light source is arranged, the plurality of light chambers being arrayed in the vehicle width direction, the light chamber having a translucent body that forms a light-emitting surface, and the small-vehicle direction indicator device performing a dynamic direction indication by chain-reactive switch-ons or switch-offs of the plurality of light sources when the directional signal light is activated, wherein in the directional signal light, the plurality of light chambers that are arrayed in the vehicle width direction are partitioned by a light-blocking wall made of an opaque member, and wherein an end portion of the light-blocking wall reaches the light-emitting surface that is formed by the translucent body of each light chamber and a hook portion is formed at the end portion, to thereby block out light between the light-emitting surfaces of the light chambers that are adjacent to each other.

(8) In the small-vehicle direction indicator device as set forth above in (1), the translucent body that forms the light-emitting surface may be joined to a front end of the light-blocking wall made of the opaque member, which is a member different from that of the translucent body.

(9) In the small-vehicle direction indicator device as set forth above in (8), the translucent body may be supported by the front end of the light-blocking wall.

(11) In the small-vehicle direction indicator device as set forth above in (8) the hook portion may form an end face that is flush with the light-emitting surfaces.

(12) In the small-vehicle direction indicator device as set forth above in (11), on the light-emitting surface of the translucent body, a step portion may be formed, and the step portion may be joined to the hook portion, which is formed at the end portion of the light-blocking wall, by being brought into abutment therewith from a light chamber side.

(13) In the small-vehicle direction indicator device as set forth above in (1), the light source may be a light-emitting diode; in each of the light chambers, there may be provided: an electric circuit substrate that forms one surface of each of the light chambers and also that controls the light source; a lens body, as a translucent body, that forms a surface facing the electric circuit substrate; and a screen wall that stretches between the electric circuit substrate and the lens body; and the light-blocking wall may form, as part of the screen wall, a partition wall between the light chambers adjacent to each other.

(14) In the small-vehicle direction indicator device as set forth above in (13), the directional signal light may include an exterior member to which the electric circuit substrate is attached with a fastening member, and the fastening member and the light-blocking wall may be arranged so as to overlap when seen from a side of the lens body.

(15) In the small-vehicle direction indicator device as set forth above in (14) the hook portion may form an end face that is flush with light-emitting surfaces of the lens bodies.

(16) In the small-vehicle direction indicator device as set forth above in (1), for a width of the hook portion of the light-blocking wall when seen from a side of the lens body, at least 1 mm may be secured.

(17) In the small-vehicle direction indicator device as set forth above in (16), a spacing between proximate outer edges of light-emitting areas of the lens bodies of the light chambers adjacent to each other may be in a range not over 15 mm.

Advantage of the Invention

According to the small-vehicle direction indicator device of the present invention as set forth above in (1), even if the left-right width of the directional signal light is comparatively narrow, switch-on or switch-off of one light source is unlikely to be influenced by overlapping of light on the light-emitting surface resulting from switching-on or switching-off of another light source across the light-blocking wall because the end portion of the light-blocking wall reaches the light-emitting surface of each light chamber and a hook portion is formed at the end portion, and hence, light between the light-emitting surfaces of the adjacent light chambers is blocked. Therefore, even in a directional signal light with a narrow left-right width, it is easy to recognize a dynamic direction indication by chain-reactive switch-ons and switch-offs of the light sources. Namely, even with a directional signal light with a comparatively narrow left-right width, it is possible to improve visibility of a dynamic direction indication by sequential lighting.

According to the small-vehicle direction indicator device of the present invention as set forth above in (8) to (9) and (11) to (12), if any of the light sources is switched on, it is possible to cause only the light-emitting surface that faces this light source to illuminate while preventing the adjacent light-emitting surface(s) from illuminating.

According to the small-vehicle direction indicator device of the present invention as set forth above in (13), leakage of light between the adjacent light chambers is prevented. Therefore, even in a directional signal light with a narrow left-right width, it is possible to effectively form light chambers that make the chain-reactive switch-ons and switch-offs of the light-emitting diodes as the light sources more likely to be recognized as an indication of light that shows a dynamic direction indication.

According to the small-vehicle direction indicator device of the present invention as set forth above in (14) or (15), when seen from the side of the lens body as a translucent body, the fastening member of the electric circuit substrate is unlikely to be seen, to thereby make it possible to improve the appearance of the directional signal light.

According to the small-vehicle direction indicator device of the present invention as set forth above in (16), with a width of the hook portion of the light-blocking wall when seen from the side of the lens body being set to 1 mm or greater, it is possible to make clearer the separation between the light chambers than the case where the width is less than 1 mm, and hence, to prevent the effect of showing a dynamic direction indication from being weakened.

According to the small-vehicle direction indicator device of the present invention as set forth above in (17), with the spacing between the light-emitting areas of the adjacent lens bodies being wider than 15 mm, even if chain-reactive switch-ons and switch-offs are performed, continuous connection of light is attenuated, to thereby make it unlikely to be recognized as a dynamic direction indication. However, with the spacing being set to less than 15 mm, it is possible to maintain the continuous connection of light, to thereby make it likely to be recognized as a dynamic direction indication.

DESCRIPTION OF THE EMBODIMENTS

Hereunder is a description of an embodiment of the present invention, with reference to the drawings. Note that the directions of front, rear, left, right, and the like in the following description are the same as those of the vehicle described below unless otherwise specified. At an appropriate location in each drawing used in the following description, there are shown an arrow FR denoting a front direction of the vehicle, an arrow LH denoting a left direction of the vehicle, an arrow UP denoting an up direction of the vehicle. In the figure, a line CL denotes a vehicular left-right center.

Figure 1:
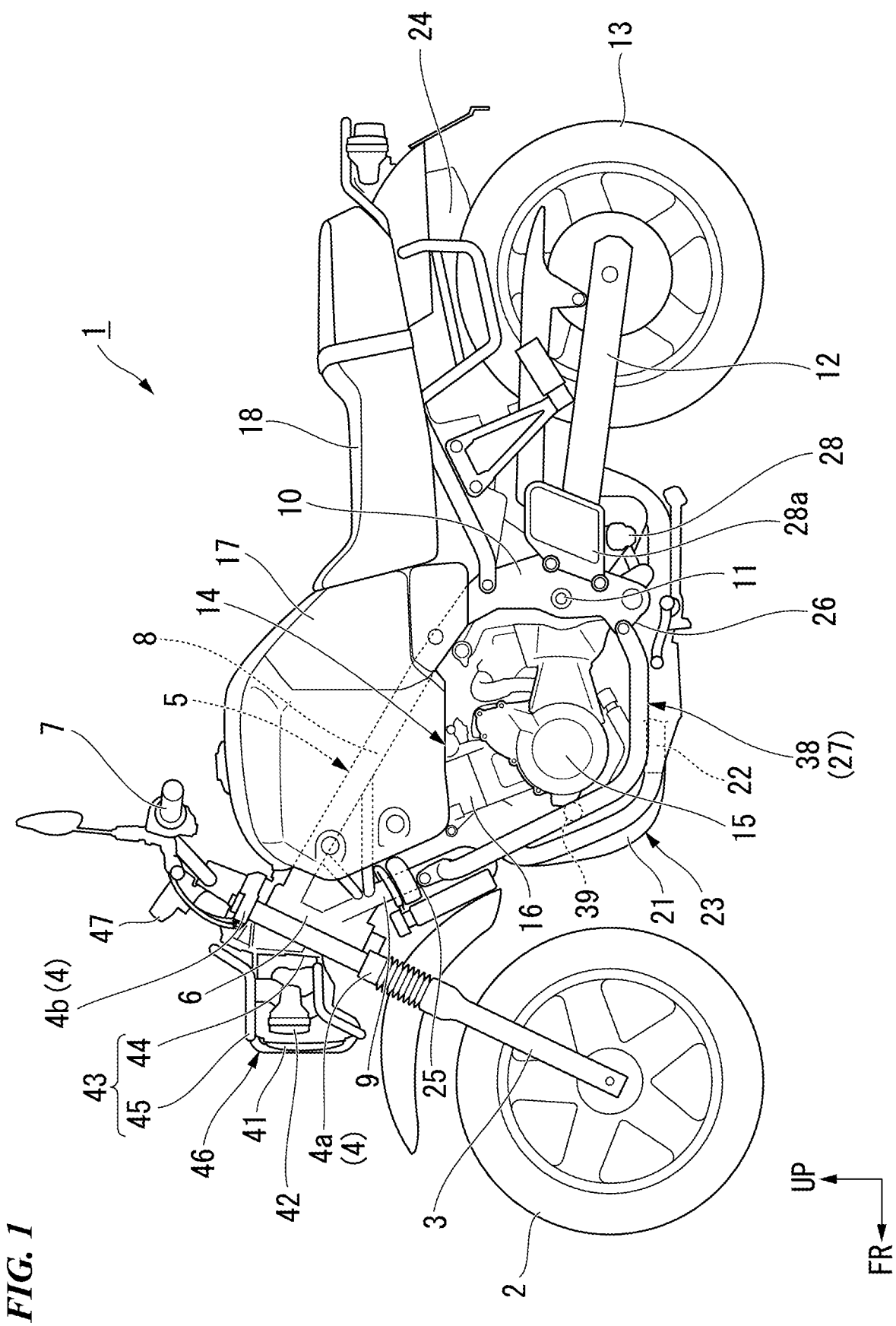
FIG. 1 is a left side view of an automotive two-wheeled vehicle according to an embodiment of the present invention.
Figure 2:
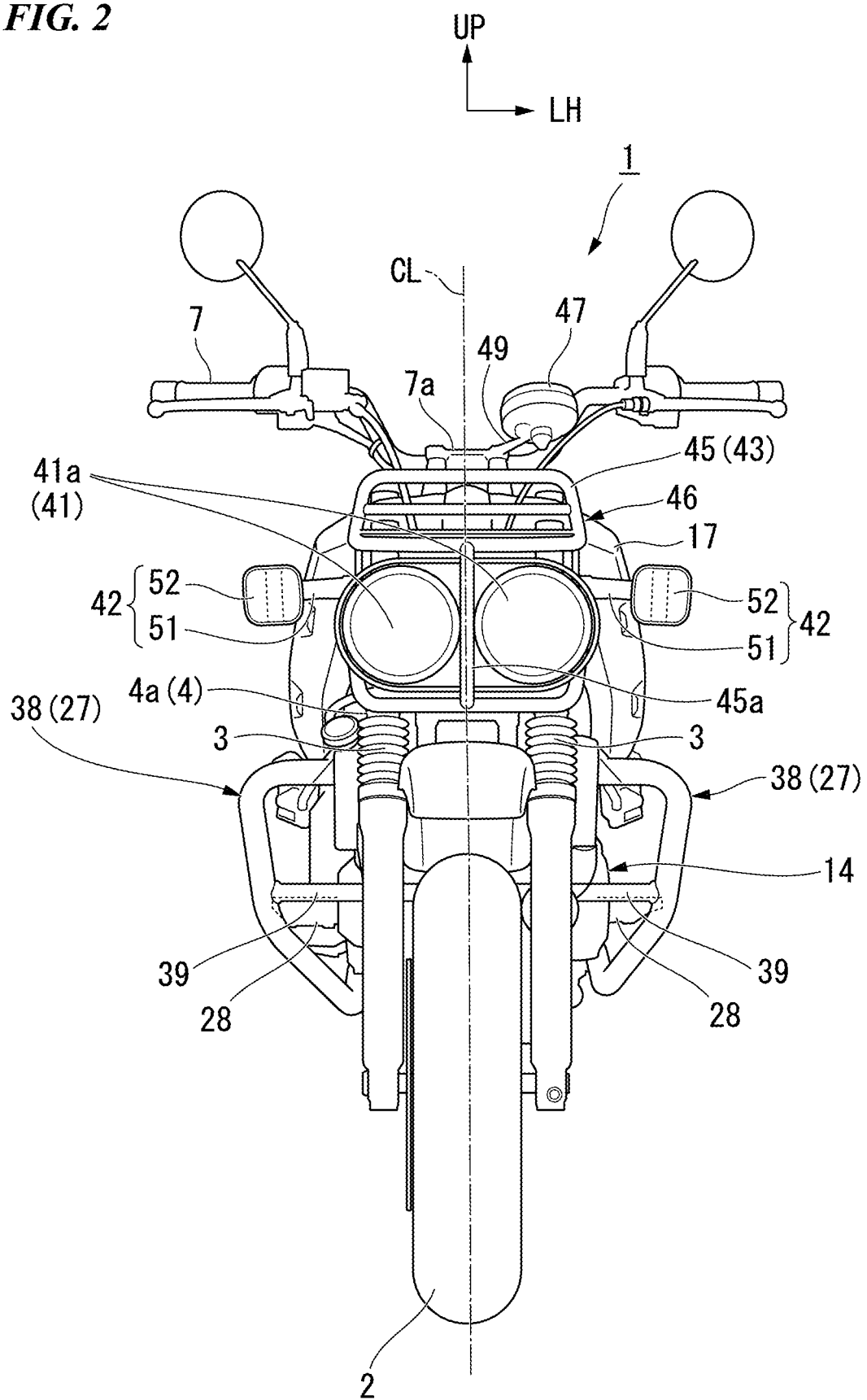
FIG. 2 is a front view of the automotive two-wheeled vehicle.

In an automotive two-wheeled vehicle 1 shown in FIG. 1 and FIG. 2, a front wheel 2 thereof is pivotally supported between lower ends of a pair of left and right front fork legs 3 in a rotatable manner. An upper portion of the pair of left and right front fork legs 3 is pivotally supported in a steerable manner in a head pipe 6 possessed at a front end of a vehicle body frame 5 via a bottom bracket 4a of a steering stem 4. To a top bracket 4b of the steering stem 4, there is fixed a bar handle 7 for steering.

The vehicle body frame 5 is formed by integrally linking, for example, a plural types of steel materials by a joining means such as welding. From a rear side of an upper portion of the head pipe 6, there extend left and right main frames 8 toward an obliquely lower rear direction. From a rear side of a lower portion of the head pipe 6, there extend left and right down frames 9 toward an obliquely lower rear direction toward lower rear portions of the left and right main frames 8.

To rear end portions of the left and right main frames 8, there are respectively connected upper end portions of left and right pivot frames 10, which extend downwardly from the rear end portions. To middle portions of the left and right pivot frames 10 in an up-down direction, there is horizontally attached a pivot shaft 11 that extends in the vehicle width direction. By the pivot shaft 11, there are pivotably supported front end portions of swing arms 12 in a swingable manner. Between rear end portions of the swing arms 12, there is pivotally supported a rear wheel 13 in a rotatable manner. Above the left and right main frames 8, there is arranged a fuel tank 17. Behind the fuel tank 17, there is arranged a seat 18.

Below the left and right main frames 8 and also behind the left and right down frames 9, there is mounted, for example, a water-cooling 4-stroke DOHC 4-valve straight-2-cylinder engine 14. As for the engine 14, a cylinder 16 is erected in a slightly leaned-forward posture on a front portion of a crank case 15. To a front portion of the cylinder 16, there is connected a base end of an exhaust pipe 23. The exhaust pipe 23 has: a downward extension portion 21 that extends downwardly after extending in a vehicle front direction from the cylinder 16; and a rearward extension portion 22 that is in communication with the downward extension portion 21 and extends below the engine 14 from a lower end of the downward extension portion 21 toward a rearward direction. A rear portion of the rearward extension portion 22 is displaced to a vehicle right side. To a rear end of the rear portion, there is attached a silencer 24. The rear portion of the rearward extension portion 22 is supported by a lower portion of the right pivot frame 10. To both sides of the lower portions of the left and right pivot frames 10, there are respectively attached left and right steps 28, which protrude outwardly in the vehicle width direction, via left and right step brackets 28a.

To a front portion of the vehicle body, there is attached a guard member (guard pipe) 27 that suppresses the grounding of the vehicle component parts at the time when the vehicle body banks. The guard member 27 is attached so as to stretch between left and right first joining portions 25, which are possessed respectively by the left and right down frames 9, and second joining portions 26, which are possessed respectively by the left and right pivot frames 10. The guard member 27 has: a pair of left and right main unit portions 38 that are provided respectively on both sides of the vehicle body; and a link member 39 that extends in the vehicle width direction and links between the left and right main unit portions 38.

A support stay 43 that supports a headlight 41 and front blinkers 42 is made of a main stay 44 and a sub stay 45.

The headlight 41 and the front blinkers 42 are attached to the sub stay 45. These are formed as an integrated assembly 46. The main stay 44 is fastened and fixed to the steering stem 4 while the sub stay 45 is attached to the main stay 44 with bolts or the like, and hence, is supported thereby. The sub stay 45 has a frame structure in which pipe members are combined, and hence, both of reduced weight and rigidity acquisition are available.

The headlight 41 has left and right lighting units 41a. Between the left and right lighting units 41a, there is sandwiched a center pipe 45a of the sub stay 45.

In the vicinity of the clamp of the bar handle 7, there is arranged a circular meter 47. The meter 47 is arranged so as to be offset from the vehicular left-right center CL to one of the left and right sides (the left side, in the present embodiment). A meter stay 49 that supports the meter 47 is formed integrally with a clamp member 7a that holds the bar handle 7 to a top bracket 4b. To be more specific, a flange piece that extends from the clamp member 7a is used as the meter stay 49.

The front blinkers 42 are provided pairwise so as to stretch outwardly from the left and right sides of the headlight 41.

The front blinker 42 includes: a blinker support base 51 which has a cylindrical shape along the vehicle width direction and whose inner end in the vehicle width direction is attached to the sub stay 45; and a blinker main unit (directional signal light) 52 that is supported by an outer end of the blinker support base 51 in the vehicle width direction.

Figure 3:
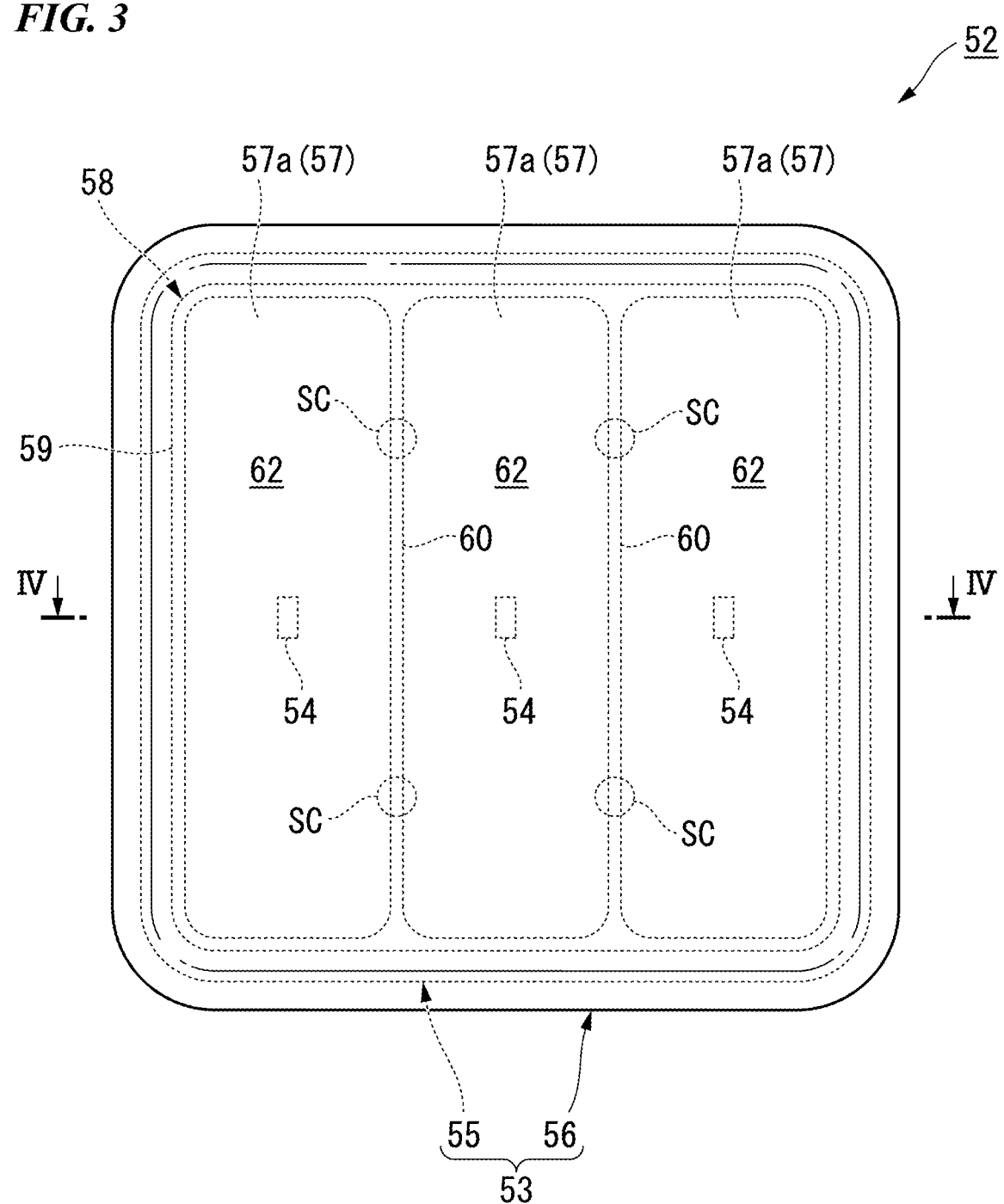
FIG. 3 is a front view of a blinker main unit of a front blinker of the automotive two-wheeled vehicle.
Figure 4:
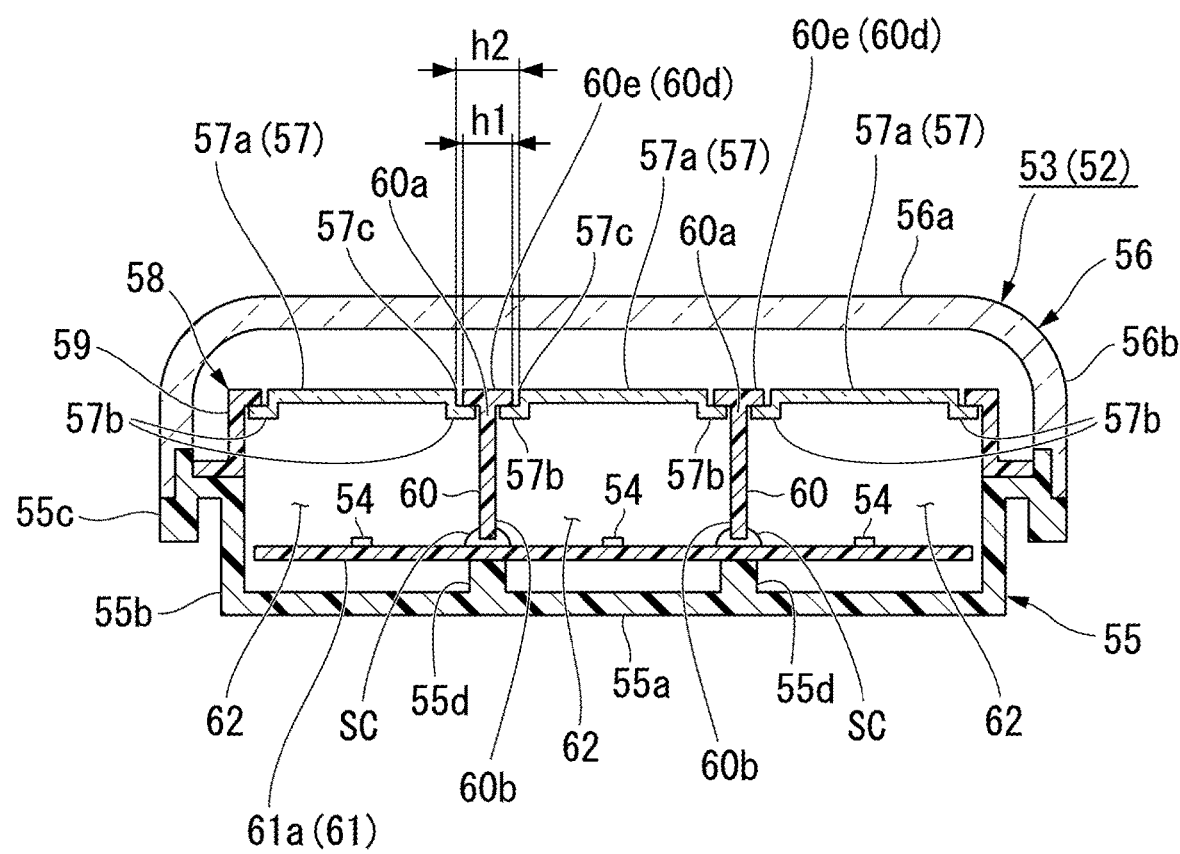
FIG. 4 is a cross-sectional view of FIG. 3, taken along IV-IV.

Referring to FIG. 3 and FIG. 4, the blinker main unit 52 contains LEDs (light-emitting diodes) 54 as light sources in a lighting unit 53 with, for example, a square shape when seen from front. The lighting unit 53 includes: a container-like body 55 that opens toward front; and an outer lens 56 that covers a front opening of the body 55 from front.

The body 55 is formed as one unit from an opaque resin or the like with light blocking effect. The body 55 integrally has: a bottom wall portion 55a that forms a rear surface of the blinker main unit 52; a circumferential wall portion 55b that is forwardly erected from an outer circumference of the bottom wall portion 55a; and a lens joining portion 55c that is provided along an outer circumference of a front end of the circumferential wall portion 55b.

The outer lens 56 is formed as one unit from a colored or colorless transparent resin or the like. The outer lens 56 has: a light-emitting wall portion 56a that forms a front surface of the blinker main unit 52; and a circumferential wall portion 56b that is erected rearwardly from an outer circumference of the light-emitting wall portion 56a. The outer lens 56 is a clear lens without a lens cut pattern, but may be a cut lens with a lens cut pattern.

A rear end of the circumferential wall portion 56b of the outer lens 56 is joined, in a seal state, to the lens joining portion 55c of the body 55. As a result, the integrally joined lighting unit 53 is formed, and also an air-tight space is formed in the lighting unit 53.

In the lighting unit 53, there are contained an LED substrate 61, inner lenses (lens bodies) 57, and an extension (screen wall) 58.

The LED substrate 61 includes: an electric circuit substrate 61a that is arranged in an erect manner in the vicinity of the bottom wall portion 55a of the body 55; and a plurality of (three, in the present embodiment) LEDs 54 that are arranged in, for example, the left-right direction on a front surface of the electric circuit substrate 61a that faces in the vehicle front direction. The LEDs 54 have a chip-like shape, and are mounted on the front surface of the electric circuit substrate 61a on which a lighting control circuit is formed. On the front surface of the bottom wall portion 55a of the body 55, there are protrudingly provided bosses 55d on which the LED substrate 61 is fixed with screws SC.

A plurality of (three, which corresponds to the number of the LEDs 54, in the present embodiment) inner lens 57 are provided so as to form light-emitting surfaces (translucent surfaces) 57a each of which has a size obtained by substantially equally dividing the shape of the blinker main unit 52 when seen from front into three in the left-right direction. The inner lens 57 is formed as one unit from a colored or colorless transparent resin or the like. The inner lens 57 is formed in a plate-like shape that is erected in front of the LED 54 so as to face the LED 54. The inner lens 57 is joined to and supported by a front end of the adjacent portion of the extension 58. The inner lens 57 is a cut lens with a lens cut pattern, but may be a clear lens without a lens cut pattern.

The extension 58 is formed as one unit from an opaque resin or the like with light blocking effect. The extension 58 has: a frame portion 59 with a square-shape when seen from front, which is arranged on an inner circumferential side of the circumferential wall portion 56b of the outer lens 56 in a spaced manner; and partition walls (division walls, light-blocking walls) 60 that stretch across the top and bottom of the frame portion 59.

In the frame portion 59, a rear end thereof is joined integrally to a front end of the circumferential wall portion 55b of the body 55.

A plurality of (two) partition walls 60 are arrayed in the vehicle width direction so that, between the inner lenses 57 and the LED substrate 61, a space surrounded by the frame portion 59 and the circumferential wall portion 55b is partitioned into a plurality of (three) light chambers 62 for each pair of inner lens 57 and LED 54. To and by a front end 60a of the partition wall 60, side edges of the adjacent inner lenses 57 are joined and supported.

For its corresponding light chamber 62, each inner lens 57 forms a light-emitting surface 57a that is long in the up-down direction. The light-emitting surface 57a is formed in a rectangular shape whose four corners are chamfered when seen in a front view. The light-emitting surfaces 57a are aligned flush with each other. Between the adjacent light-emitting surfaces 57a, the front end 60a of each division wall is sandwiched. Furthermore, the front ends 60a are aligned flush with each other. As a result, even if any of the LEDs 54 illuminates, it is possible to cause only the light-emitting surface 57a that faces this LED 54 to illuminate without allowing the adjacent light-emitting surface(s) 57a to illuminate.

Figure 5:
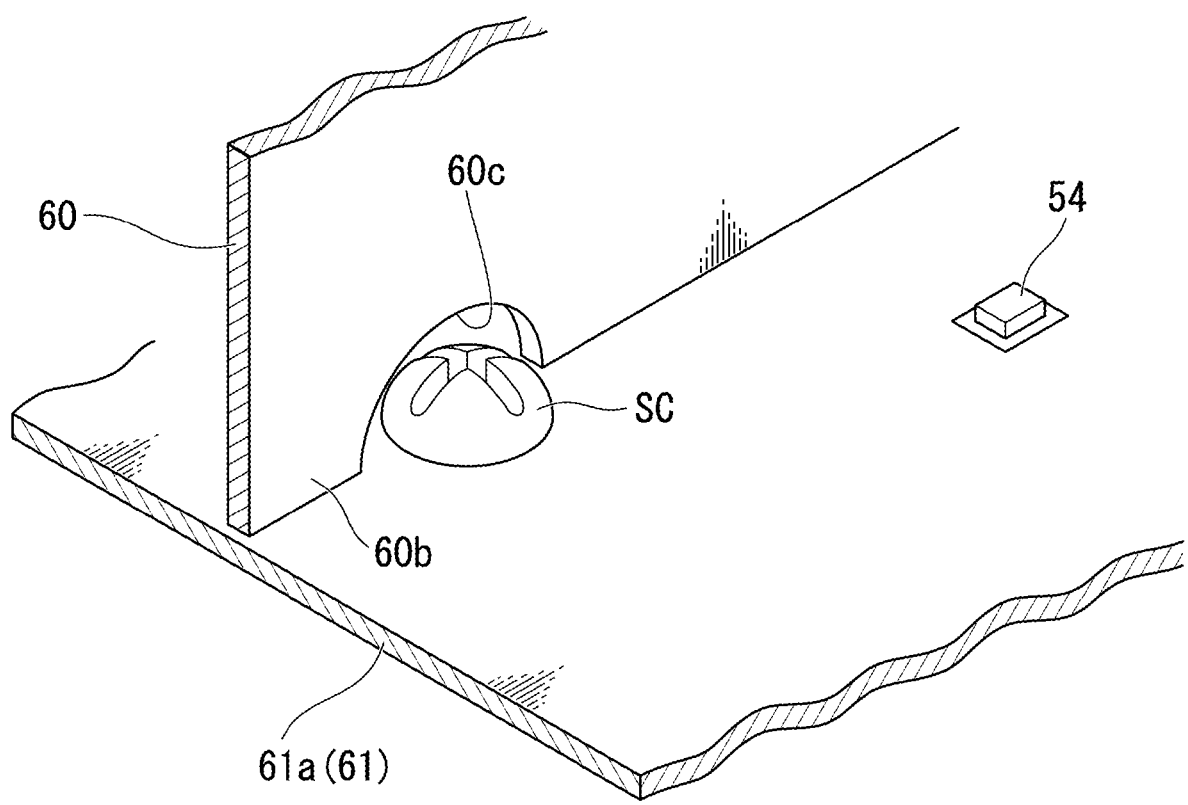
FIG. 5 is a perspective view of a vicinity of a rear end of a partition wall of the blinker main unit.

With additional reference to FIG. 5, the partition wall 60 is arranged so as to overlap the screws SC when seen from their erect directions, namely, when seen from the side of the inner lens 57, which is a translucent body. In a rear end 60b of the partition wall 60, are formed notches 60c in advance for avoiding the heads of the screws SC. The partition wall 60 is brought close to the front surface of the electric circuit substrate 61a, and suppresses the leakage of light between the light chambers 62.

On front ends of the partition walls 60 and the frame portion 59, there are formed hook portions 60d that are brought in abutment with and is joined to step portions 57b, which are formed on outer circumferences of the light-emitting surfaces 57a of the inner lenses 57, from behind (the light chamber 62 side). The hook portion 60d forms an end face 60e that is flush with the light-emitting surfaces 57a. A width h1 of the end face 60e in the left-right direction (the thickness direction of the partition wall 60) is set so as to be 1 mm or greater. Between the adjacent inner lenses 57, a spacing h2 between proximate outer edges (end edges adjacent to the hook portion 60d) 57c of the light-emitting areas (light-emitting surfaces 57a) is set so as not to be greater than 15 mm.

Figure 6:
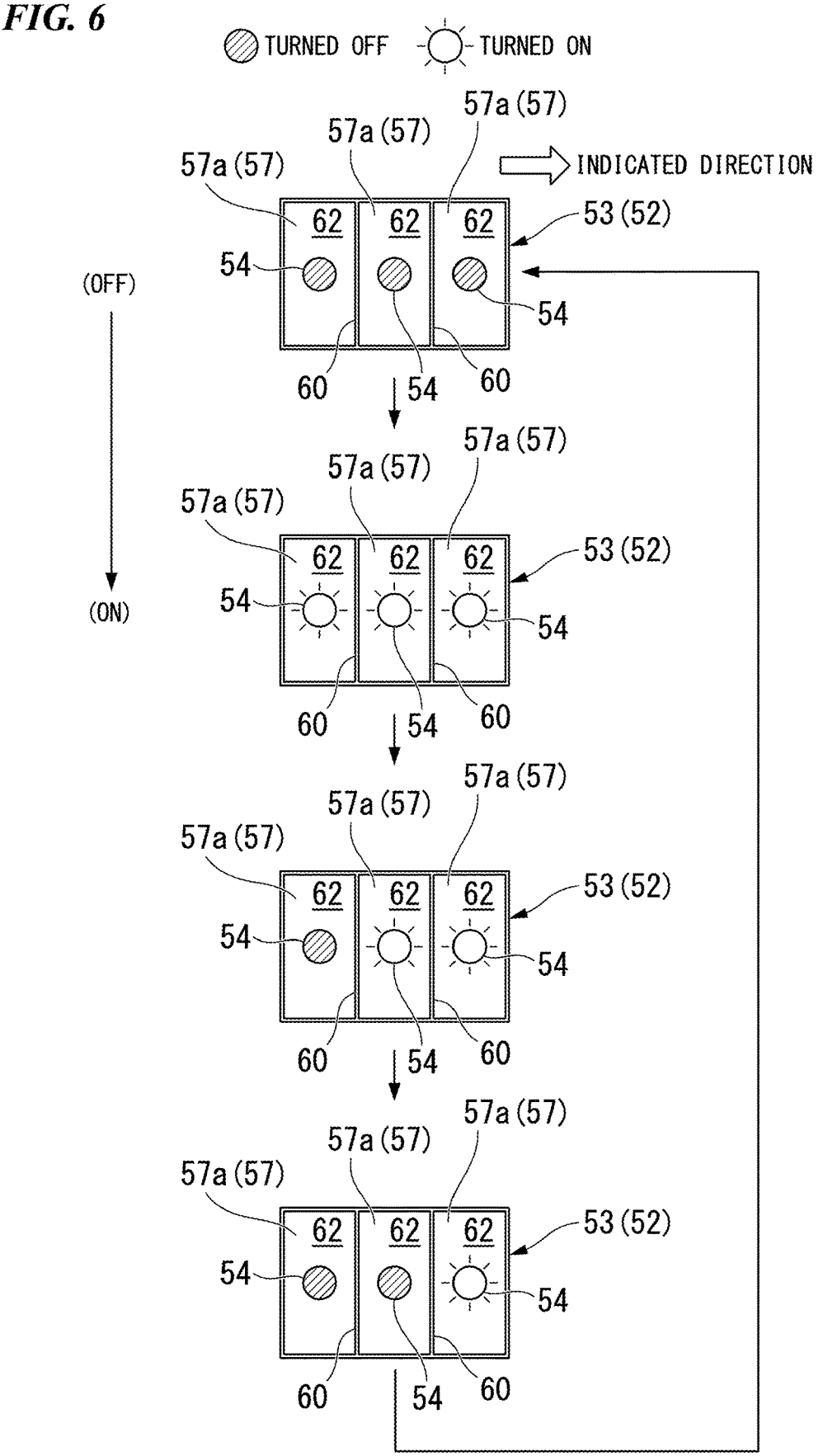
FIG. 6 is an explanatory diagram showing a lighting pattern of the blinker main unit.

FIG. 6 is an explanatory diagram of a lighting pattern of the blinker main unit 52. As shown in FIG. 6, from the state in which all the light sources are switched off (OFF state of the blinker switch), the blinker main unit 52 on the indicated direction side firstly switches on all the light sources through an ON operation on the blinker switch, and then switches off the light sources one by one from the direction opposite to the indicated direction. Then, the blinker main unit 52 repeats a lighting pattern of, after switching off all the light sources, switching on all the light sources again. In other words, the blinker main unit 52 repeats a chain-reactive lighting pattern of performing a dynamic direction indication while switching off the light sources step-by-step. Note that the indicated direction signifies a direction of travel (direction of turn) of the automotive two-wheeled vehicle 1 that is shown by the blinker main unit 52.

Figure 7:
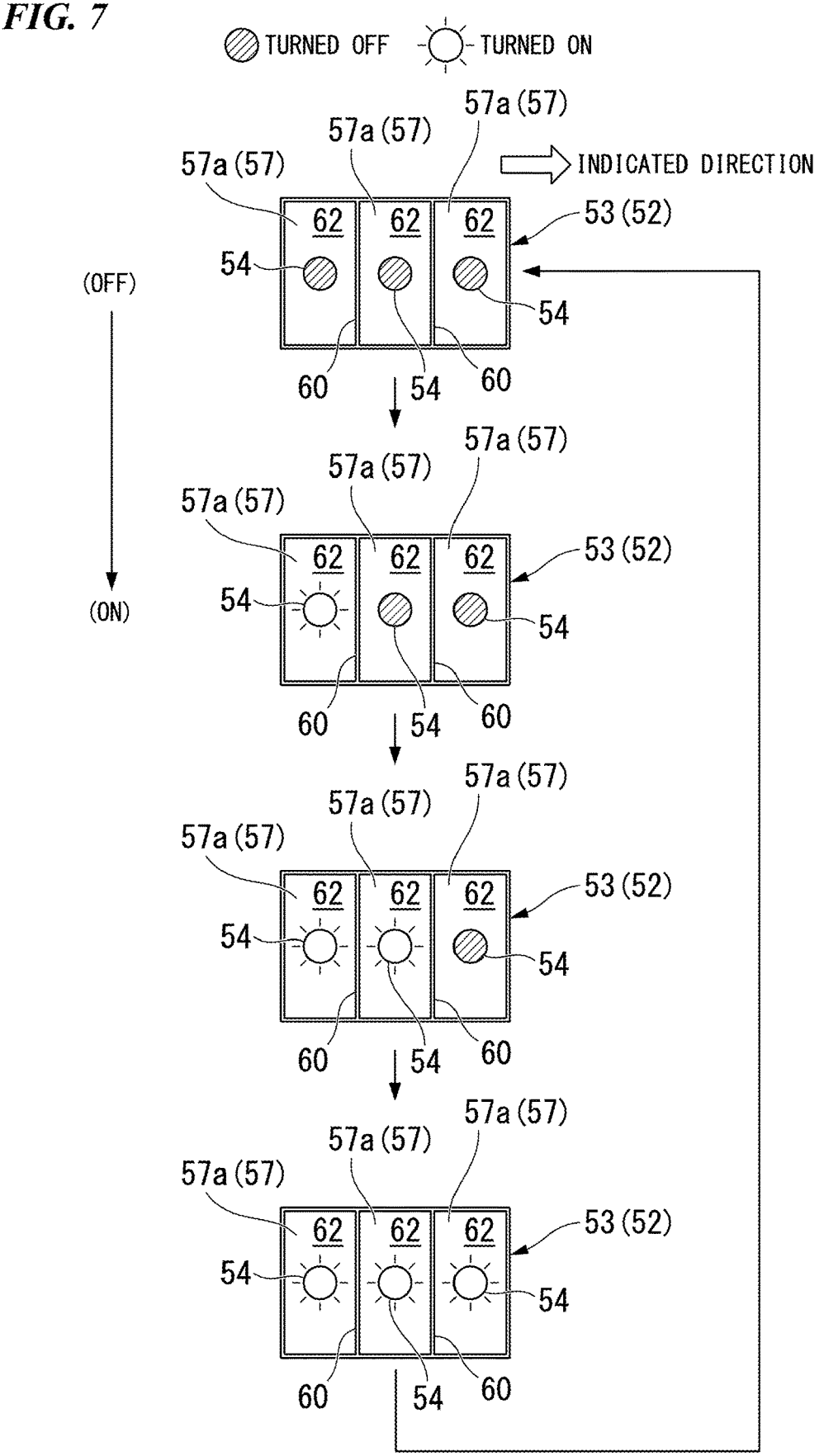
FIG. 7 is an explanatory diagram showing another lighting pattern of the blinker main unit.

FIG. 7 is an explanatory diagram of another sequential lighting pattern of the blinker main unit 52. In this case, from the state in which all the light sources are switched off (OFF state of the blinker switch), the blinker main unit 52 on the indicated direction side firstly switches on the light sources one by one from the direction opposite to the indicated direction through an ON operation on the blinker switch. Then, the blinker main unit 52 repeats a lighting pattern of, after switching on all the light sources, switching off all the light sources again. In other words, the blinker main unit 52 repeats a chain-reactive lighting pattern of performing a dynamic direction indication while switching on the light sources step-by-step.

Figure 8:
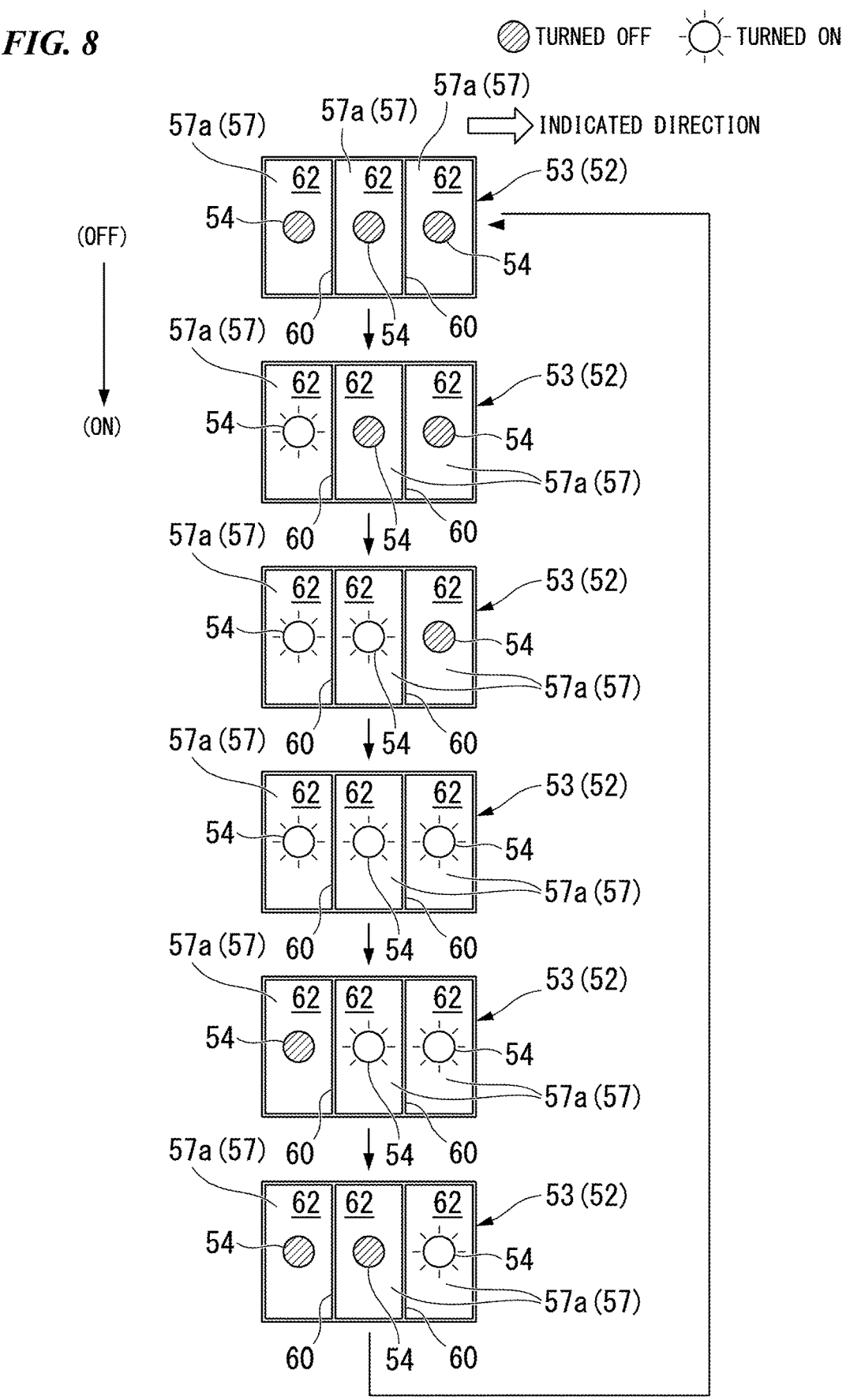
FIG. 8 is an explanatory diagram showing still another lighting pattern of the blinker main unit.

FIG. 8 is an explanatory diagram of a lighting pattern in which the lighting patterns of FIG. 6 and FIG. 7 are combined. In this case, firstly all the light sources are switched on step-by-step in the lighting pattern of FIG. 7, and then the process is shifted to the lighting pattern of FIG. 6 to switch off all the light sources step-by-step. As a result, it is possible to perform a dynamic direction indication as if light flows in the indicated direction.

Figure 9:
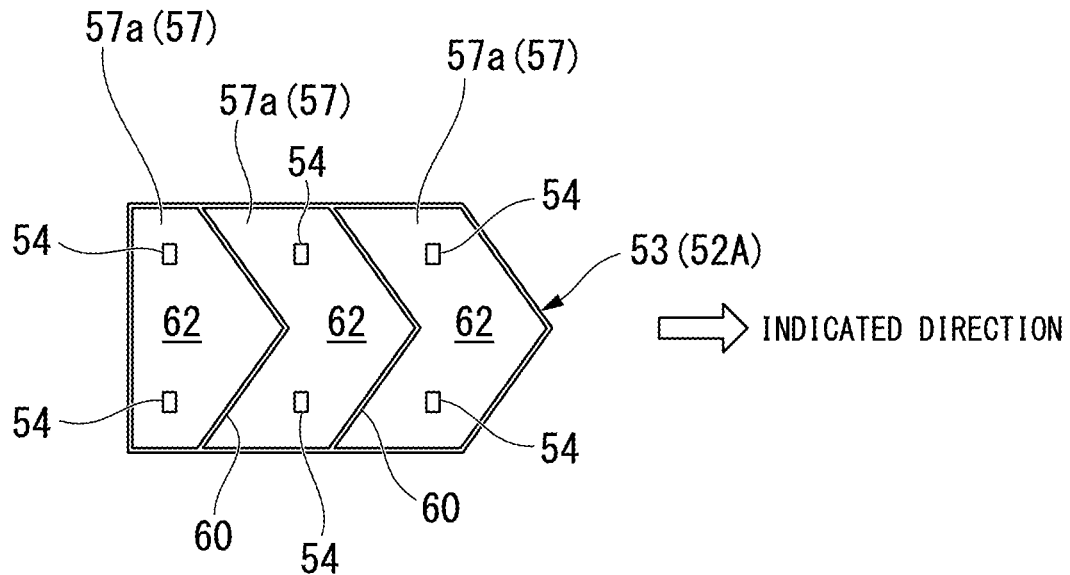
FIG. 9 is a front view showing a modification of the blinker main unit.
Figure 10:
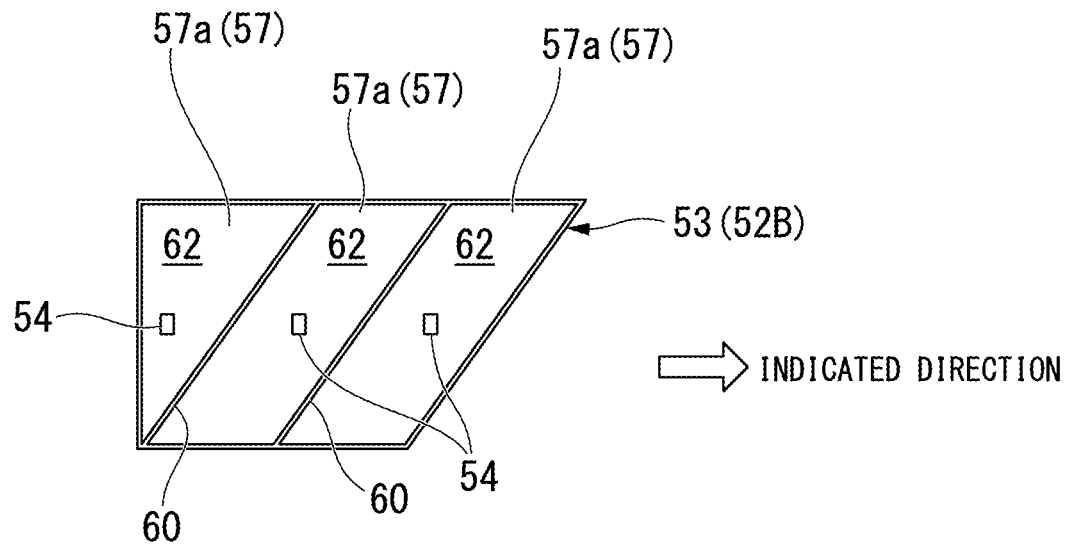
FIG. 10 is a front view showing another modification of the blinker main unit.
Figure 11:
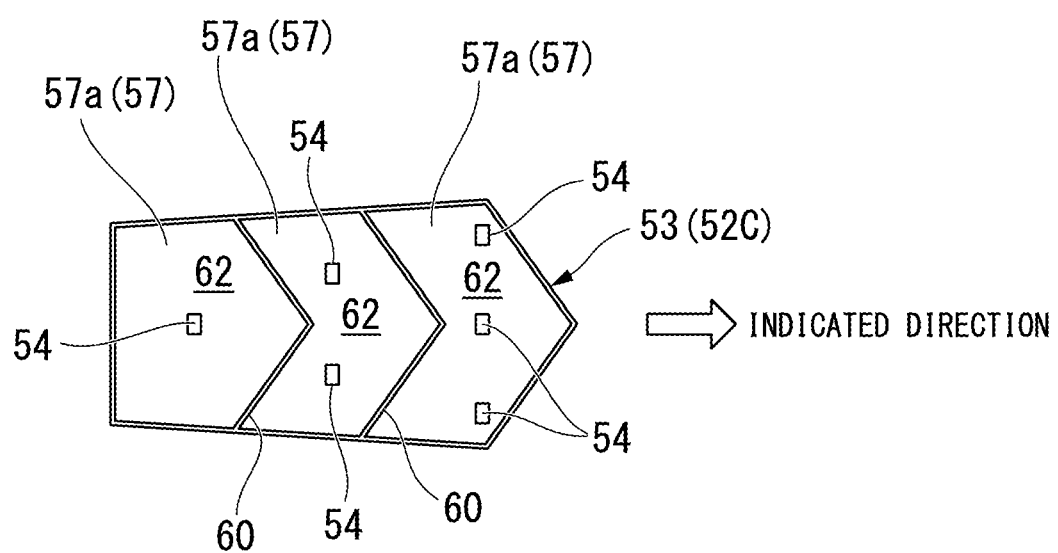
FIG. 11 is a front view showing still another modification of the blinker main unit.

FIG. 9 to FIG. 11 are explanatory diagrams showing modifications of arrangement and the like of the light-emitting surfaces 57a and the LEDs 54 of the blinker main unit 52 of FIG. 3.

In a blinker main unit 52A shown in FIG. 9, in contrast to the blinker main unit 52 of FIG. 3, for example an end portion on the indicated direction side when seen from front (the right side in the figure) is formed in a V shape that is convexed in the indicated direction, and at the same time, each partition wall 60 is formed in a bent manner so as to have a V-shape similar to that of the end portion. As a result, the light-emitting surface 57a of each light chamber 62 has an arrow shape facing in the indicated direction, and hence, it is possible to show an indicated direction by means of the shape as well.

In a blinker main unit 52B shown in FIG. 10, in contrast to the blinker main unit 52 of FIG. 3, for example an upper portion on the on the indicated direction side when seen from front (the right side in the figure) extends in the indicated direction, and an end portion on the indicated direction side is provided in an inclined manner. At the same time, each partition wall 60 is provided in an inclined manner so as to have an inclination similar to that of the end portion. As a result, the upper portion of the light-emitting surface 57a of each light chamber 62 has a shape that extends in the indicated direction, and hence, it is possible to show an indicated direction by means of the shape in a similar manner as described above.

A blinker main unit 52C of FIG. 11 is formed, in contrast to the blinker main unit 52 of FIG. 3, so that for example a vertical width changes according to its position in the left-right direction (to be more specific, so that its vertical width is wider toward the indicated direction side), and also at least one of the light chambers 62 has a different number of LEDs 54 from that of the other light chambers 62 (to be more specific, the number of LEDs 54 is changed from one to two and then to three for the light chamber 62 on the side opposite to the indicated direction to the light chamber 62 on the side of the indicated direction). As a result, it is possible to show an indicated direction by means of the shape in a similar manner as described above. Furthermore, because it is brighter toward the indicated directions side, it is possible to show the indicated direction also by a change in brightness as well.

Here, the partition walls 60 of the blinker main unit 52 in FIG. 3 are provided so as to be orthogonal to the vehicle width direction (so as to be along the vertical direction), but may be inclined with respect to the vertical direction as is the case with the partition walls 60 of the blinker main unit 52B in FIG. 10. Furthermore, the partition walls 60 of the blinker main unit 52 may be bent at the middle position in the vertical direction as is the case with the partition walls 60 of the blinker main units 52A, 52C in FIG. 9, FIG. 11. Furthermore, the partition walls 60 of the blinker main unit 52 may be curved in an arc shape instead of being bent as described above. Furthermore, each of the partition walls 60 arranged in the vehicle width direction may be provided at different inclination angles from each other instead of being in parallel to each other, or alternatively, may be provided with different bent or arc shapes from each other.

In the blinker main units 52, 52B of FIG. 3, FIG. 10, a single LED 54 is arranged in each light chamber 62, for example, at the vertically middle position. However, in the blinker main unit 52A of FIG. 9, a plurality of (for example, a vertical pair of) LEDs 54 is arranged in each light chamber 62 while in the blinker main unit 52C of FIG. 11, one to three LEDs 54 are arranged in the light chambers 62, respectively, from the side opposite to the indicated direction to the side of the indicated direction. A shape of each blinker main unit, the number and arrangement of the light sources, and the like are not limited to those of the structures shown in the figures, but can be appropriately modified and, furthermore, can be appropriately combined.

Note that the number of the light chambers 62 is preferably three or greater in view of performing a dynamic direction indication. Namely, in the present embodiment, the number of the light chambers 62 is three, but the number of the light chambers 62 may be four or greater.

As has been described above, in the small-vehicle direction indicator device according to the above embodiment, the blinker main unit 52 of the automotive two-wheeled vehicle 1 includes: a lighting unit 53; and a plurality of light sources (LEDs 54) that are arrayed in the lighting unit 53 in a vehicle width direction, the small-vehicle direction indicator device performing a dynamic direction indication by chain-reactive switch-ons or switch-offs of the light sources when the blinker main unit 52 is activated, wherein between the light sources, a partition wall 60 made of an opaque member is arranged, and wherein a plurality of the partition walls 60 are arrayed in the vehicle width direction.

According to this structure, even if the left-right width of the blinker main unit 52 is comparatively narrow, switch-on or switch-off of one light source is unlikely to be influenced by overlapping of light resulting from switching-on or switching-off of another light source across the partition wall 60. Therefore, even in a blinker main unit 52 with a narrow left-right width, it is easy to recognize a dynamic direction indication by chain-reactive switch-ons and switch-offs of the light sources. Namely, even with a blinker main unit 52 with a comparatively narrow left-right width, it is possible to provide a small-vehicle direction indicator device that is capable of improving visibility of a dynamic direction indication by sequential lighting.

Furthermore, in the above small-vehicle direction indicator device, the blinker main unit 52 include a plurality of light chambers 62 in which at least one light source is arranged; the light chambers 62 are arrayed in the vehicle width direction; and each space between the light chambers 62 is partitioned by each of the partition walls 60.

According to this structure, the light chambers 62 with light source(s) are arranged in the vehicle width direction while each space between the light chambers 62 is partitioned by each of the partition walls 60. Therefore, a change in brightness of a light chamber 62 in the case where the light source(s) thereof are switched on or off is unlikely to influence its adjacent light chamber 62. This prevents an influence by overlapping of light between the light chambers 62 or by other causes, to thereby make it easy to clearly recognize the switch-ons and switch-offs for every light chamber 62. Therefore, even with a blinker main unit 52 with a comparatively narrow left-right width, it is possible to make chain-reactive switch-ons and switch-offs in the vehicle width direction more likely to be recognized as an indication of light that shows a dynamic direction indication.

Furthermore, in the above small-vehicle direction indicator device, in each of the light chamber 62, there are provided: an electric circuit substrate 61a that forms one surface thereof and also controls the light source (LED 54); an inner lens 57, as a translucent body, that forms a surface facing the electric circuit substrate 61a; and an extension 58 that stretches between the electric circuit substrate 61a and the inner lens 57, and the partition wall 60 partitions, as part of the extension 58, the adjacent light chambers 62.

According to this structure, leakage of light between the adjacent light chambers 62 is prevented. Therefore, even in a blinker main unit 52 with a narrow left-right width, it is possible to effectively form light chambers 62 that make the chain-reactive switch-ons and switch-offs of the light sources more likely to be recognized as an indication of light that shows a dynamic direction indication.

Furthermore, in the above small-vehicle direction indicator device, the blinker main unit 52 includes a body 55 to which the electric circuit substrate 61a is attached with a screw SC, and the screw SC and the extension 58 are arranged so as to overlap when seen from a side of the inner lens 57.

According to this structure, when seen from the side of the inner lens 57 as a translucent body, the fastening member of the electric circuit substrate 61a is unlikely to be seen, to thereby make it possible to improve the appearance of the blinker main unit 52.

Furthermore, in the above small-vehicle direction indicator device, for a width h1 of an end face 60e of the partition wall 60 when seen from the side of the inner lens 57, at least 1 mm is secured.

According to this structure, with a width h1 of the end face 60e of the partition wall 60 when seen from the side of the inner lens 57 being set to 1 mm or greater, it is possible to make clearer the separation between the light chambers 62 than the case where the width h1 is less than 1 mm, and hence, to prevent the effect of showing a dynamic direction indication from being weakened.

Furthermore, in the above small-vehicle direction indicator device, a spacing h2 between proximate outer edges 57c of light-emitting areas (light-emitting surfaces 57a) of the inner lens 57 of the light chambers 62 adjacent to each other is in a range not over 15 mm.

According to this structure, with the spacing between the light-emitting areas of the adjacent inner lenses 57 being wider than 15 mm, even if chain-reactive switch-ons and switch-offs are performed, continuous connection of light is attenuated, to thereby make it unlikely to be recognized as a dynamic direction indication. However, with the spacing being set to less than 15 mm, it is possible to maintain the continuous connection of light, to thereby make it likely to be recognized as a dynamic direction indication.

Furthermore, in the above small-vehicle direction indicator device, when activated, the blinker main unit 52 performs a dynamic direction indication by, after switching on all of the light sources, sequentially switching off the light sources from the light source on a side opposite to an indicated direction to the light source on a side of the the indicated direction.

According to this structure, with a direction indication being performed by sequentially switching off the light sources, it is possible to perform a dynamic and novel direction indication toward the indicated direction compared with commonly-used lighting in which light sources are sequentially switched on.

Note that the present invention is not limited to the aforementioned embodiment. For example, for the light source of the directional signal light, not only a chip-like LED but also a variety of light sources may be used such as an LED in which a shell-type lens is integrated, or alternatively, a bulb in which not an LED but a filament is used. Furthermore, the present invention is not limited to a structure in which an outer lens and inner lenses are included, but may have a structure that includes lens bodies of a single type.

In the saddle riding type vehicles, vehicles in general on which a driver rides by straddling the body are included. Therein are included not only automotive two-wheeled vehicles (including bicycles with a motive engine and motor-scooter type vehicles), but also vehicles with three wheels (including those with one front wheel and two rear wheels and also those with two front wheels and one rear wheel) or with four wheels. Furthermore, in the small vehicles other than saddle riding type vehicles, vehicles in general in which the driver rides without straddling the body are included.

Furthermore, the structure in the aforementioned embodiment is an example of the present invention, and various modifications such as replacing constituent element(s) of the embodiment with known constituent element(s) can be made without departing from the spirit or scope of the present invention.

BRIEF DESCRIPTION OF THE REFERENCE SYMBOLS

1: automotive two-wheeled vehicle (small vehicle such as saddle riding type vehicle)
52: blinker main unit (directional signal light)
53: lighting unit
54: LED (light source, light-emitting diode)
55: body (exterior member)
57: inner lens (lens body)
57a: light-emitting area (light-emitting surface)
57c: proximate outer edge
58: extension (screen wall)
60: partition wall (light-blocking wall)
60e: end face
61a: electric circuit substrate
62: light chamber
h1: width of end face
h2: spacing between proximate outer edges
SC: screw (fastening member)

The invention claimed is:
1. A small-vehicle direction indicator device, comprising a directional signal light for small vehicles,
the directional signal light comprising: a lighting unit, a plurality of light sources that are arrayed in the lighting unit in a vehicle width direction, and a plurality of light chambers in which at least one light source is arranged,
the plurality of light chambers being arrayed in the vehicle width direction,
the light chamber having a translucent body that forms a light-emitting surface, and
the small-vehicle direction indicator device performing a dynamic direction indication by chain-reactive switch-ons or switch-offs of the plurality of light sources when the directional signal light is activated,
wherein in the directional signal light, the plurality of light chambers that are arrayed in the vehicle width direction are partitioned by a light-blocking wall made of an opaque member, and
wherein an end portion of the light-blocking wall reaches the light-emitting surface that is formed by the translucent body of each light chamber and a hook portion is formed at the end portion, to thereby block out light between the light-emitting surfaces of the light chambers that are adjacent to each other.

2. The small-vehicle direction indicator device according to claim 1, wherein the translucent body that forms the light-emitting surface is joined to a front end of the light-blocking wall made of the opaque member, which is a member different from that of the translucent body.

3. The small-vehicle direction indicator device according to claim 2, wherein the translucent body is supported by the front end of the light-blocking wall.

4. The small-vehicle direction indicator device according to claim 2, wherein the hook portion forms an end face that is flush with the light-emitting surfaces.

5. The small-vehicle direction indicator device according to claim 4, wherein on the light-emitting surface of the translucent body, a step portion is formed, and wherein the step portion is joined to the hook portion, which is formed at the end portion of the light-blocking wall, by being brought into abutment therewith from a light chamber side.

6. The small-vehicle direction indicator device according to claim 1,
wherein the light source is a light-emitting diode,
wherein in each of the light chambers, there are provided: an electric circuit substrate that forms one surface of each of the light chambers and also that controls the light source; a lens body, as the translucent body, that forms a surface facing the electric circuit substrate; and a screen wall that stretches between the electric circuit substrate and the lens body, and
wherein the light-blocking wall forms, as part of the screen wall, a partition wall between the light chambers adjacent to each other.

7. The small-vehicle direction indicator device according to claim 6,
wherein the directional signal light comprises an exterior member to which the electric circuit substrate is attached with a fastening member, and
wherein the fastening member and the light-blocking wall are arranged so as to overlap when seen from a side of the lens body.

8. The small-vehicle direction indicator device according to claim 7, wherein the hook portion forms an end face that is flush with light-emitting surfaces of the lens bodies.

9. The small-vehicle direction indicator device according to claim 1,
wherein for a width of the hook portion of the light-blocking wall when seen from a side of the lens body, at least 1 mm is secured.

10. The small-vehicle direction indicator device according to claim 9,
wherein a spacing between proximate outer edges of light-emitting areas of the lens bodies of the light chambers adjacent to each other is in a range not over 15 mm.

* * * * *